May 12, 1925.
H. W. BUNDY
TUBING
Filed Dec. 3, 1923
1,537,404
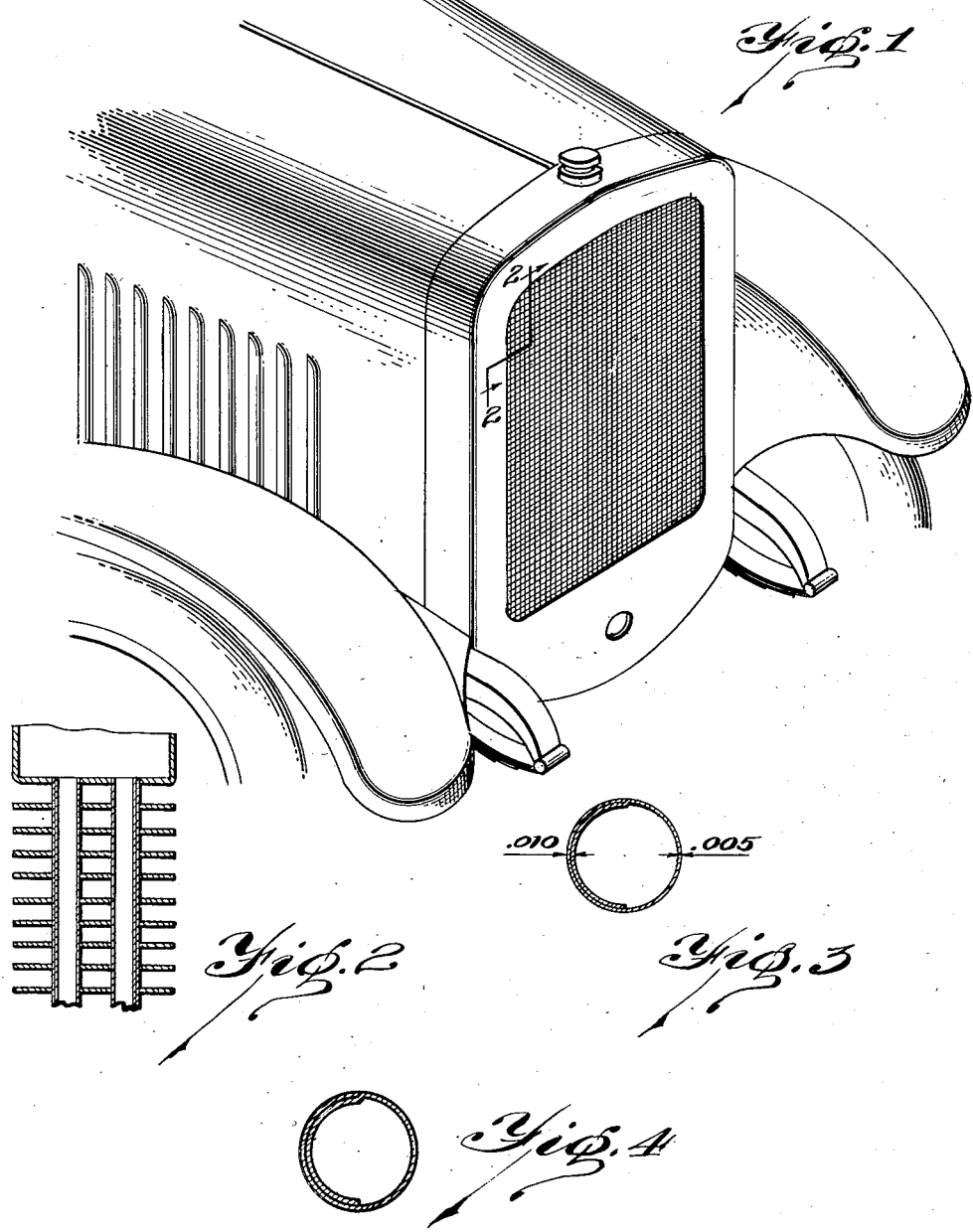
Inventor
Harry W. Bundy
By Stuart C. Barnes
Attorney Patented May 12, 1925.

1,537,404

UNITED STATES PATENT OFFICE.

HARRY W. BUNDY, OF DETROIT, MICHIGAN.

TUBING.

Application filed December 3, 1923. Serial No. 678,173.

*To all whom it may concern:*

Be it known that I, HARRY W. BUNDY, a citizen of the United States, residing at Detroit, in the county of Wayne and State of Michigan, have invented certain new and useful Improvements in Tubing, of which the following is a specification.

This invention relates to relatively light gauge tube and has for its object a tube which is cheaper than ordinary lock-seam tube, yet which for a great many purposes will serve just as well. It is primarily intended for radiator tubing.

It is customary now to use lockseam tubing for automobile radiator construction. In some of the higher priced cars, seamless tubing is used, but this is altogether too expensive for the purpose in view. The lock-seam tubing is usually treated to a bath of solder to make the seam watertight.

It is the object of the present invention to afford radiator tubing which is even cheaper than lock-seam and less liable to leak. It has all the capabilities of lock-seam tubing, but is cheaper to manufacture and requires less stock.

Referring to the drawings:

Fig. 1 is a fragmentary perspective showing an automobile radiator.

Fig. 2 is a section taken on the line 2—2 of Fig. 1.

Fig. 3 is a cross section of my improved tubing.

Fig. 4 is a cross section showing in exaggerated relation the soldered coating.

In Fig. 1 I have shown in perspective an automobile radiator for the purpose of indicating to the eye of the searcher, the purpose for which the tubing is primarily intended. However, the tubing may have other uses, and hence I do not limit myself entirely to radiator tubing.

Lock-seam tubing for radiators is ordinarily made of .010 copper strip. However, in order to produce the material for the seam itself, it requires 20% more material. Plural ply tube is not broadly new. A tube of this kind known as the "Bundy tube" is claimed in my prior Patent No. 1,431,368, October 10, 1922. This tube is made by first solder-coating or tinning the strip stock, then forming it up by rolls and dies and passing it through a sweating die where the solder is melted and caused to cement the two plies together. This is my preferred way of making the tube, but obviously other ways may be employed. A tube of this kind affords a very satisfactory substitute for seamless tube. In fact, in some particulars, it is much better than seamless tube and is ordinarily cheaper to manufacture.

However, this tube cannot compete with lock-seam tube for automobile radiator construction for the reason that lock-seam tube is satisfactory for the purpose and is cheaper to manufacture. The reason for this is that lock-seam tube is made of heavier stock and costs less per pound than the plural ply tube, which is made of lighter stock. For instance, the present prices of material of which lock-seam radiator tube is made is 20¢ per pound for .010 copper strip stock. In order to make the same gauge tube out of a plurality of plies in the form of the so-called Bundy tube, it is necessary to use .005 stock, but this stock at present prices costs 27¢ per pound. Now, it is true that less stock is needed to make the Bundy tube than the lock-seam tube which requires an additional 20% for the seam. However, this 20% adds only 4¢ so that the lock-seam for a given unit comparison would beat the Bundy tube 3¢ per pound in price. Obviously, with the close ways of figuring in large production today, it will make ordinary plural ply tube unavailable for radiator tube.

It is the object of the present invention to produce a modification of the original Bundy tube that will make it suitable for radiator construction. I find that thinness of the walls of the tube is no objection in radiator tubing, except in so far as it interferes with the rigidity of the tube in assembling and supporting the fins. In so far as the fluid containing capacity of the tube is concerned, the tube may be very thin. The thickness of the tube is provided in order to give rigidity so that the tubes may be pushed through the fins in assembling the tubes and fins together. Now in order to get this rigidity, it is found necessary to use .010 stock, the .005 stock would not give the tube the necessary rigidity for assembling or supporting the fins. However, the .005 stock is ample to act as a liquid container and carry the fluid from the top header to the bottom header. In fact, the thinner the tube stock the better cooling capacity the tubes will have, for they bring the liquid more closely into contact with the cooling air.

These things having been given consideration, I have designed a form of the Bundy tube which is calculated to give the rigidity necessary for radiator tube, but which effects a considerable saving in material over the lock-seam tube, and consequently makes a tube of this kind a cheaper substitute for lock-seam tube in radiator construction. To this end, I use a relatively thin stock, say .005 of an inch. Instead of forming a plural ply tube where the plural plies run around the complete circumference of the cross section of the tube, I run the plural plies only part way around. I am aware that it is old to use lap seams in tubing, but so far as I am aware, a light gauge tube has never been made of such a light gauge stock as to be inherently flexible and then reinforced by a lap which constitutes a reinforcing arch for resisting bending strains. It is a well known fact that an arch has a relatively great resistance to crushing strain, especially strains communicated to the arch at its apex. It is also a well known fact that a channel section is relatively strong and resistant to bending stresses.

With these facts in mind I have formed my tube of a relatively light gauge metal, to wit: approximately .005 of an inch thick, which is in copper tube inherently flexible, and which will require external support for using the tube to push as a rigid member. In order to provide this external support, I provide an overlapping of the plies which is sufficient to form a relatively deep channel section or arch. Preferably, this channel section or arch formed by the overlapping is substantially half the circumference of the tube; this forms, as it were, a backbone for the tube which could not be afforded by only a slight overlap or simply a lock-seam. This overlapping gives the inherently flexible tube a stiffness which will push the tube through the fins and also affords a backbone for the inherently flexible walls so that the same will stand erect in the radiator and support the fins that are soldered thereto.

Now, making a comparison of cost with the figures above given, it will be seen that a tube thus constructed requires approximately three-fourths of the material used in the lock-seam tube without adding material required for the lock-seam. Now, taking 20¢ per pound as a unit of comparison, and which is the present price of copper stock of .010 thickness, it will be seen that the cost of a unit with the 20% additional for the seam is 24¢; the cost of the same unit where only three-fourths as much material is required in my improved tube will be three-fourths of 27¢, which is the present cost per pound of copper stock of .005 of an inch thickness. This figured out will amount to 20¼¢ for the same unit of tube, making a net saving over lock-seam tube approximating 20%. This obviously, when translated into large figures of production which obtain in some of our large automobile factories, means enormous savings in the course of a year.

What I claim is:

1. A relatively light gauge tubing, comprising a plural ply single tube for heat exchange purposes made of relatively thin gauge stock, so thin that a tube made of single ply would be so flexible as to lack utility where a stiff tube is required and in which the plies overlap and are secured together for only substantially one-half the cross section of the tube for the purpose of giving reinforcement and stiffness.

2. A relatively light gauge tubing for use in heat exchange systems, formed from relatively thin stock and so thin that the tube, if made single would be inherently flexible but wherein the stock is overlapped for a portion only of the cross section of the tube to give a reinforcing arch or channel to afford stiffness to the tube.

3. A relatively light gauge tubing, comprising a relatively thin sheet metal stock approximating .005 of an inch formed up into a tube with overlapping plies cemented together but overlapping only a portion of the circumference of the tube, but of considerable width for forming a reinforcing channel or arch and saving material on the non-overlapping portion.

In testimony whereof I affix my signature.

HARRY W. BUNDY.